US010083006B1

United States Patent
Feuz et al.

(10) Patent No.: US 10,083,006 B1
(45) Date of Patent: Sep. 25, 2018

(54) INTERCOM-STYLE COMMUNICATION USING MULTIPLE COMPUTING DEVICES

(71) Applicant: Google Inc., Mountain View, CA (US)

(72) Inventors: Sandro Feuz, Zurich (CH); Sebastian Millius, Zurich (CH); Jan Althaus, Zurich (CH)

(73) Assignee: GOOGLE LLC, Mountain View, CA (US)

( * ) Notice: Subject to any disclaimer, the term of this patent is extended or adjusted under 35 U.S.C. 154(b) by 0 days.

(21) Appl. No.: 15/702,164

(22) Filed: Sep. 12, 2017

(51) Int. Cl.
*G10L 21/00* (2013.01)
*G06F 3/16* (2006.01)
*G10L 15/22* (2006.01)
*H04L 29/08* (2006.01)

(52) U.S. Cl.
CPC .............. *G06F 3/167* (2013.01); *G10L 15/22* (2013.01); *G10L 2015/225* (2013.01); *H04L 67/18* (2013.01)

(58) Field of Classification Search
CPC .... G10L 15/22; G10L 2015/225; G06F 3/167
USPC ........................................................ 704/270
See application file for complete search history.

(56) References Cited

U.S. PATENT DOCUMENTS

| 9,641,954 B1 | 5/2017 | Typrin et al. |
| 2014/0172953 A1 | 6/2014 | Blanksteen |
| 2015/0339905 A1* | 11/2015 | Stevens ................. G08B 21/02 340/4.1 |
| 2017/0245125 A1* | 8/2017 | Child ...................... H04W 4/12 |

OTHER PUBLICATIONS

Nucleus Wi-Fi Intercom (https://nucleuslife.com/); dated 2017; 34 pages.

* cited by examiner

*Primary Examiner* — Jakieda Jackson
(74) *Attorney, Agent, or Firm* — Middleton Reutlinger

(57) ABSTRACT

Techniques are described related to improved intercom-style communication using a plurality of computing devices distributed about an environment. In various implementations, voice input may be received, e.g., at a microphone of a first computing device of multiple computing devices, from a first user. The voice input may be analyzed and, based on the analyzing, it may be determined that the first user intends to convey a message to a second user. A location of the second user relative to the multiple computing devices may be determined, so that, based on the location of the second user, a second computing device may be selected from the multiple computing devices that is capable of providing audio or visual output that is perceptible to the second user. The second computing device may then be operated to provide audio or visual output that conveys the message to the second user.

20 Claims, 6 Drawing Sheets

INTERCOM-STYLE COMMUNICATION USING MULTIPLE COMPUTING DEVICES

BACKGROUND

Humans may engage in human-to-computer dialogs with interactive software applications referred to herein as "automated assistants" (also referred to as "chat bots," "interactive personal assistants," "intelligent personal assistants," "personal voice assistants," "conversational agents," etc.). For example, humans (which when they interact with automated assistants may be referred to as "users") may provide commands, queries, and/or requests using spoken natural language input (i.e. utterances) which may in some cases be converted into text and then processed, and/or by providing textual (e.g., typed) natural language input.

In some cases, automated assistants may include automated assistant "clients" that are installed locally on client devices and that are engaged directly by users, as well as cloud-based counterpart(s) that leverage the virtually limitless resources of the cloud to help automated assistant clients respond to users' queries. For example, the automated assistant client may provide, to the cloud-based counterpart(s), an audio recording of the user's query (or a text conversion thereof) and data indicative of the user's identity (e.g., credentials). The cloud-based counterpart may perform various processing on the query to return various results to the automated assistant client, which may then provide corresponding output to the user. For the sakes of brevity and simplicity, the term "automated assistant," when described herein as "serving" a particular user, may refer to the automated assistant client installed on the particular user's client device and any cloud-based counterpart that interacts with the automated assistant client to respond to the user's queries.

Many users may engage automated assistants using multiple devices. For example, some users may possess a coordinated "ecosystem" of computing devices that includes one or more smart phones, one or more tablet computers, one or more vehicle computing systems, one or wearable computing devices, one or more smart televisions, and/or one or more standalone interactive speakers, among other more traditional computing devices. A user may engage in human-to-computer dialog with an automated assistant using any of these devices (assuming an automated assistant client is installed). In some cases these devices may be scattered around the user's home or workplace. For example, mobile computing devices such as smart phones, tablets, smart watches, etc., may be on the user's person and/or wherever the user last placed them (e.g., at a charging station). Other computing devices, such as traditional desktop computers, smart televisions, and standalone interactive speakers may be more stationary but nonetheless may be located at various places (e.g., rooms) within the user's home or workplace.

Techniques exist to enable multiple users (e.g., a family, co-workers, co-inhabitants, etc.) to leverage the distributed nature of a plurality of computing devices to facilitate intercom-style spoken communication between the multiple users. However, these techniques are limited to users issuing explicit commands to convey messages to explicitly-defined computing devices. For example, a first user who wishes to convey a message to a second user at another location out of earshot (e.g., in another room) must first determine where the second user is located. Only then can the first user explicitly invoke an intercom communication channel to a computing device at or near the second user's location, so that the first user can convey a message to the second user at the second user's location. If the first user does not know the second user's location, the first user may be forced to simply cause the message to be broadcast at all computing devices that are available for intercom-style communication. Moreover, if the first user is unaware that the second user is not within earshot (e.g., the first user is cooking and didn't notice the second user leaving the kitchen), the first user may not realize that intercom-style communication is necessary, and may speak the message to an empty room.

SUMMARY

Techniques are described herein for improved intercom-style communication using a plurality of computing devices distributed about an environment such as a house, an apartment, a place of business, etc. For example, techniques are described herein for enabling determination of location(s) of multiple users within the environment, so that (i) it can be determined automatically whether an intended recipient of a spoken message is within earshot of the speaker, and (ii) a suitable computing device near the intended recipient can be identified and used to output the message so that the intended recipient receives it. Additionally, techniques are described herein for automatically determining whether a user utterance constitutes (a) a command to invoke an automated assistant for normal use; (b) an attempt to convey a spoken message to another user that may potentially require the intercom-style communication described herein; and/or (c) other background noise/conversation that requires no action. Additionally, techniques are described herein for allowing a recipient of an intercom-style message received using disclosed techniques to issue a request (e.g., a search query or other commands to an automated assistant such as ordering pizza, playing a song, etc.) that is processed (e.g., using natural language processing) based at least in part on the initial message conveyed by the speaker.

In various implementations, users' locations may be determined within an environment or area by computing devices configured with selected aspects of the present disclosure using various techniques. For example, one or more computing devices may be equipped with various types of presence sensors, such as passive infrared ("PIR") sensors, cameras, microphones, ultrasonic sensors, and so forth, which can determine whether a user is nearby. These computing devices can come in various forms, such as smart phones, standalone interactive speakers, smart televisions, other smart appliances (e.g., smart thermostats, smart refrigerators, etc.), networked cameras, and so forth. Additionally or alternatively, other types of signals, such as signals emitted by mobile computing devices (e.g., smart phones, smart watches) carried by users, may be detected by other computing devices and used to determine the users' locations (e.g., using time-of-flight, triangulation, etc.). The determination of a user's location within an environment for utilization in various techniques described herein can be contingent on explicit user-provided authorization for such determination. In various implementations, users' locations may be determined "on demand" in response to determining that a user utterance constitutes an attempt to convey a spoken message to another user that may require intercom-style communication. In various other implementations, the users' locations may be determined periodically and/or at other interval and most recently determined locations utilized in determining whether an intended recipient of a spoken message is within earshot of a speaker of the spoken message and/or in identifying a suitable computing device near an intended recipient of the spoken message.

As one example, a variety of standalone interactive speakers and/or smart televisions may be distributed at various locations in a home. Each of these devices may include one or more sensors (e.g., microphone, camera, PIR sensor, etc.) capable of detecting a nearby human presence. In some embodiments, these devices may simply detect whether a person is present. In other embodiments, these devices may be able to not only detect presence, but distinguish the detected person, e.g., from other known members of a household. Presence signals generated by these standalone interactive speakers and/or smart televisions may be collected and used to determine/track where people are located at a particular point in time. These detected locations may then be used for various purposes in accordance with techniques described herein, such as determining whether an utterance provided by a speaker is likely to be heard by the intended recipient (e.g., whether the speaker and intended recipients are in different rooms or the same room), and/or to select which of the multiple speakers and/or televisions should be used to output the utterance to the intended recipient.

In another aspect, techniques are described herein for automatically determining whether a user utterance constitutes (a) a command to invoke an automated assistant for normal use; (b) an attempt to convey a spoken message to another user that may potentially require the intercom-style communication described herein; and/or (c) other background noise/conversation that requires no action. In some implementations, a machine learning classifier (e.g., neural network) may be trained using training examples that comprise recorded utterances (and/or features of recorded utterances) that are classified (labeled) as, for instance, a command to convey a message to another user using an intercom-style communication link, a command to engage in a conventional human-to-computer dialog with an automated assistant, or conversation that is not directed to an automated assistant (e.g., background conversation and/or noise).

In some embodiments, speech-to-text ("STT") may not be performed automatically on every utterance. Instead, the machine learning classifier may be trained to recognize phonemes in the audio recording of the voice input, and in particular to classify the collective phonemes with one of the aforementioned labels. For example, conventional automated assistants are typically invoked using one or more invocation phrases. In some cases, a simple invocation machine learning model (e.g., classifier) is trained to distinguish these invocation phrases from anything else to determine when a user invokes the automated assistant (e.g., to recognize phonemes associated with "Hey, Assistant"). With techniques described herein, the same invocation machine learning model or a different machine learning model may be (further) trained to classify utterances as being intended to convey a message to another user, which may or may not require use of intercom-style communications described herein. In some implementations, such a machine learning model may be used, e.g., in parallel with an invocation machine learning model or after the invocation machine learning model determines that the user is not invoking the automated assistant, to determine whether the user may benefit from using intercom-style communication to cause a remote computing device to convey a message to another user.

In some implementations, a machine learning model may be trained, or "customized," so that it is possible to recognize names spoken by a user and to attach those names with other individuals. For example, an automated assistant may detect a first utterance such as "Jan, can you pass me the salt?" The automated assistant may detect a second utterance, presumably from Jan, such as "Sure, here you go." From these utterances and the associated phonemes, the automated assistant may learn that when a user makes a request to Jan, it should locate the individual with Jan's voice. Suppose that later, Jan is talking on the phone in a separate room. When the user says something like "Jan, where are my shoes," the automated assistant may determine from this utterance (particularly, "Jan, . . . ") that the utterance contains a message for the individual, Jan. The automated assistant may also determine that Jan is probably out of earshot, and therefore the message should be conveyed to Jan as an intercom message. By detecting Jan's voice on a nearby client device, the automated assistant may locate Jan and select the nearby client device to output the speaker's message.

In other implementations, a user may invoke an automated assistant using traditional invocation phrases and then explicitly command the automated assistant to cause some other computing device to output a message to be conveyed to a recipient. The other computing device may be automatically selected based on the recipient's detected location as described above, or explicitly designated by the speaking user.

In yet another aspect, techniques are described herein for allowing a recipient of an intercom-style message received using disclosed techniques to leverage context provided in the received intercom message to perform other actions, such as issuing a search query or a command to an automated assistant. For example, after perceiving a conveyed intercom message, the recipient may issue a search query, e.g., at the computing device at which she received the conveyed intercom message or another computing device. Search results may then be obtained, e.g., by an automated assistant serving the second user, that are responsive to the search query. In some implementations, the search results may be biased or ranked based at least in part on content of the originally conveyed intercom message. Additionally or alternatively, in some implementations, the recipient's search query may be disambiguated based at least in part on content of the originally conveyed intercom message.

In some implementations in which an initial utterance is used to provide context to downstream requests by a recipient user, to protect privacy, the original speaker's utterance may be transcribed (STT) only if it is determined that the recipient makes a downstream request. If the recipient simply listens to the message and does nothing further, no SST may be performed. In other implementations, the original speaker's utterance may always be processed using SST (e.g., on determination that the utterance is to be conveyed through intercom-style communication), but the resulting transcription may be stored only locally and/or for a limited amount of time (e.g., long enough to give the recipient user ample time to make some downstream request).

In some implementations, one or more computing devices may wait till an intended user is able to perceive a message (e.g., within earshot) till they convey a message using techniques described herein. For example, suppose a first user conveys a message to an intended recipient but the intended recipient has stepped outside momentarily. In some implementations, the first computing device to detect the recipient upon their return may output the original message.

In some implementations, a method performed by one or more processors is provided that includes: receiving, at a microphone of a first computing device of a plurality of computing devices, from a first user, voice input; analyzing the voice input; determining, based on the analyzing, that the first user intends to convey a message to a second user; determining a location of the second user relative to the plurality of computing devices; selecting, from the plurality of computing devices, based on the location of the second user, a second computing device that is capable of providing audio or visual output that is perceptible to the second user; and causing the second computing device to exclusively provide audio or visual output that conveys the message to the second user (e.g., only the second computing device provides the output, to the exclusion of other computing devices).

These and other implementations of technology disclosed herein may optionally include one or more of the following features.

In various implementations, the analyzing may include applying an audio recording of the voice input as input across a trained machine learning model to generate output, wherein the output indicates that the first user intends to convey the message to the second user. In various implementations, the machine learning model may be trained using a corpus of labelled utterances, and wherein labels applied to the utterances include a first label indicative of a command to convey a message to another user and a second label indicative of a command to engage in a human-to-computer dialog with an automated assistant. In various implementations, labels applied to the utterances may further include a third label indicative of background conversation.

In various implementations, the selecting may be performed in response to a determination, based on the location of the second user, that the second user is not within earshot of the first user. In various implementations, the location of the second user may be determined based at least in part on one or more signals generated by a mobile computing device operated by the second user. Persons skilled in the art will appreciate from reading the specification that the concepts and subject matter described herein may ensure that messages are conveyed to, and received by, an intended person in a manner which is efficient for the technical equipment used to convey and receive the messages. This may include the messages being conveyed and delivered for perception by the intended person at an appropriate time, so that the messages can be properly understood by the intended person and there is no requirement for messages to be re-conveyed/re-received by the technical equipment for this purpose. The technical equipment may include the multiple computing devices referred to above, as well as a network over which the messages may be conveyed between the devices. The efficiency in the manner in which, and the times at which, messages are conveyed may result in at least more efficient use of the network between the computing devices and also more efficient use of the computational resources, within the computing devices, which are employed to convey and receive the messages.

In various implementations, the location of the second user may be determined based at least in part on one or more signals generated by one or more of the plurality of computing devices other than the first computing device. In various implementations, the one or more signals may include a signal indicative of the second user being detected by one or more of the plurality of computing devices other than the first computing device using passive infrared or ultrasound. In various implementations, the one or more signals may include a signal indicative of the second user being detected by one or more of the plurality of computing devices other than the first computing device using a camera or a microphone.

In various implementations, the analyzing may include determining that the voice input includes an explicit command to convey the message to the second user as an intercom message via one or more of the plurality of computing devices. In various implementations, the analyzing may include performing speech-to-text processing on the voice input to generate textual input, and performing natural language processing on the textual input to determine that the user intends to convey the message to the second user.

In various implementations, the method may further include: identifying a search query issued by the second user after the audio or visual output is provided by the second computing device; obtaining search results that are responsive to the search query, wherein the obtaining is based at least in part on the voice input from the first user; and causing one or more of the plurality of computing devices to provide output indicative of at least some of the search results.

In addition, some implementations include one or more processors of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

DETAILED DESCRIPTION

Figure 1A:
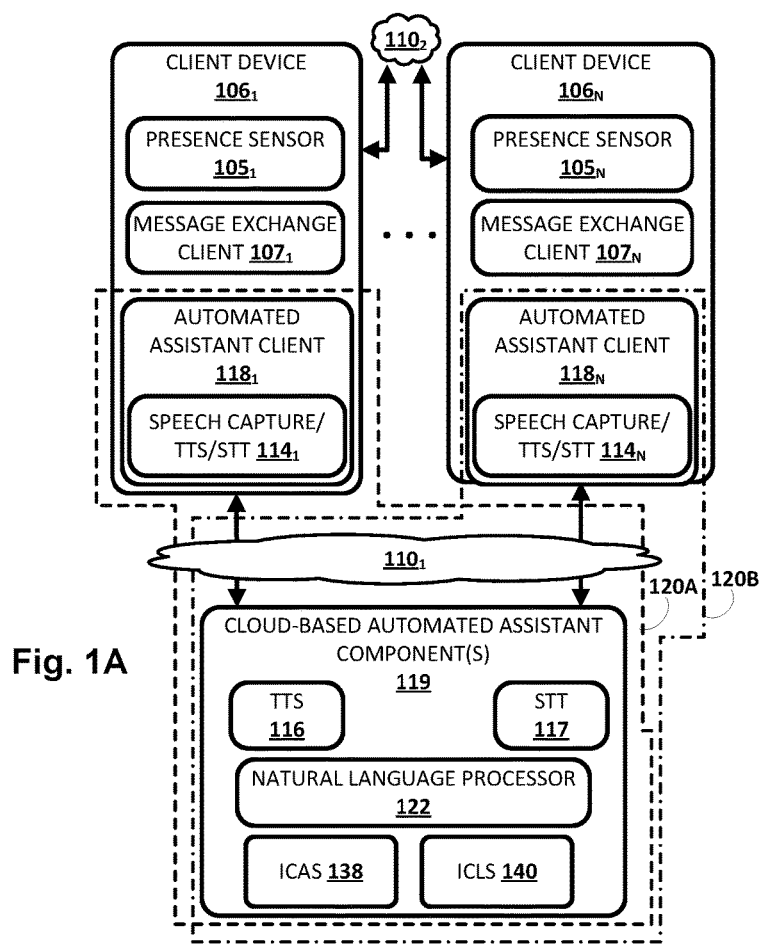
FIG. 1A is a block diagram of an example environment in which implementations disclosed herein may be implemented.

Now turning to FIG. 1A, an example environment in which techniques disclosed herein may be implemented is illustrated. The example environment includes a plurality of client computing devices $106_{1-N}$. Each client device 106 may execute a respective instance of an automated assistant client 118. One or more cloud-based automated assistant components 119, such as a natural language processor 122, may be implemented on one or more computing systems (collectively referred to as a "cloud" computing system) that are communicatively coupled to client devices $106_{1-N}$ via one or more local and/or wide area networks (e.g., the Internet) indicated generally at 110. Also, in some embodiments, the plurality of client devices $106_{1-N}$ may be communicatively coupled with each other via one or more local area networks ("LANs," including Wi-Fi LANs, mesh networks, etc.).

In some implementations, plurality of client computing devices $106_{1-N}$ (also referred to herein simply as "client devices") may be associated with each other in various ways in order to facilitate performance of techniques described herein. For example, in some implementations, plurality of client computing devices $106_{1-N}$ may be associated with each other by virtue of being communicatively coupled via one or more LANs. This may be the case, for instance, where plurality of client computing devices $106_{1-N}$ are deployed across a particular area or environment, such as a home, a building, a campus, and so forth. Additionally or alternatively, in some implementations, plurality of client computing devices $106_{1-N}$ may be associated with each other by virtue of them being members of a coordinated ecosystem of client devices 106 that are operated by one or more users (e.g., an individual, a family, employees of an organization, other predefined groups, etc.).

As noted in the background, an instance of an automated assistant client 118, by way of its interactions with one or more cloud-based automated assistant components 119, may form what appears to be, from the user's perspective, a logical instance of an automated assistant 120 with which the user may engage in a human-to-computer dialog. Two instances of such an automated assistant 120 are depicted in FIG. 1A. A first automated assistant 120A encompassed by a dashed line serves a first user (not depicted) operating first client device $106_1$ and includes automated assistant client $118_1$ and one or more cloud-based automated assistant components 119. A second automated assistant 120B encompassed by a dash-dash-dot line serves a second user (not depicted) operating another client device $106_N$ and includes automated assistant client $118_N$ and one or more cloud-based automated assistant components 119. It thus should be understood that each user that engages with an automated assistant client 118 executing on a client device 106 may, in effect, engage with his or her own logical instance of an automated assistant 120. For the sakes of brevity and simplicity, the term "automated assistant" as used herein as "serving" a particular user will refer to the combination of an automated assistant client 118 executing on a client device 106 operated by the user and one or more cloud-based automated assistant components 119 (which may be shared amongst multiple automated assistant clients 118). It should also be understood that in some implementations, automated assistant 120 may respond to a request from any user regardless of whether the user is actually "served" by that particular instance of automated assistant 120.

The client devices $106_{1-N}$ may include, for example, one or more of: a desktop computing device, a laptop computing device, a tablet computing device, a mobile phone computing device, a computing device of a vehicle of the user (e.g., an in-vehicle communications system, an in-vehicle entertainment system, an in-vehicle navigation system), a standalone interactive speaker, a smart appliance such as a smart television, and/or a wearable apparatus of the user that includes a computing device (e.g., a watch of the user having a computing device, glasses of the user having a computing device, a virtual or augmented reality computing device). Additional and/or alternative client computing devices may be provided.

In various implementations, one or more of the client computing devices $106_{1-N}$ may include one or more presence sensors $105_{1-N}$ that are configured to provide signals indicative of detected presence, particularly human presence. Presence sensors $105_{1-N}$ may come in various forms. Some client devices 106 may be equipped with one or more digital cameras that are configured to capture and provide signal(s) indicative of movement detected in their fields of view. Additionally or alternatively, some client devices 106 may be equipped with other types of light-based presence sensors 105, such as passive infrared ("PIR") sensors that measure infrared ("IR") light radiating from objects within their fields of view. Additionally or alternatively, some client devices 106 may be equipped with presence sensors 105 that detect acoustic (or pressure) waves, such as one or more microphones.

Additionally or alternatively, in some implementations, presence sensors 105 may be configured to detect other phenomena associated with human presence. For example, in some embodiments, a client device 106 may be equipped with a presence sensor 105 that detects various types of waves (e.g., radio, ultrasonic, electromagnetic, etc.) emitted by, for instance, a mobile client device 106 carried/operated by a particular user. For example, some client devices 106 may be configured to emit waves that are imperceptible to humans, such as ultrasonic waves or infrared waves, that may be detected by other client devices 106 (e.g., via ultrasonic/infrared receivers such as ultrasonic-capable microphones).

Additionally or alternatively, various client devices 106 may emit other types of human-imperceptible waves, such as radio waves (e.g., Wi-Fi, Bluetooth, cellular etc.) that may be detected by one or more other client devices 106 and used to determine an operating user's particular location. In some implementations, Wi-Fi triangulation may be used to detect a person's location, e.g., based on Wi-Fi signals to/from a client device 106. In other implementations, other wireless signal characteristics, such as time-of-flight, signal strength, etc., may be used by various client devices 106, alone or collectively, to determine a particular person's location based on signals emitted by a client device 106 they carry.

Additionally or alternatively, in some implementations, one or more client devices 106 may perform voice recognition to recognize an individual from their voice. For example, some automated assistants 120 may be configured to match a voice to a user's profile, e.g., for purposes of providing/restricting access to various resources. In some implementations, movement of the speaker may then be tracked, e.g., by one or more other presence sensors that may be incorporated, for instance, in lights, light switches, smart thermostats, security cameras, etc. In some implementations, based on such detected movement, a location of the individual may be predicted, and this location may be assumed to be the individual's location when other individual (i.e., a speaker) provides an utterance with a message for the first individual. In some implementations, an individual may simply be assumed to be in the last location at which he or she engaged with automated assistant 120, especially if no much time has passed since the last engagement.

Each of the client computing devices $106_{1-N}$ may operate a variety of different applications, such as a corresponding one of a plurality of message exchange clients $107_{1-N}$. Message exchange clients $107_{1-N}$ may come in various forms and the forms may vary across the client computing devices $106_{1-N}$ and/or multiple forms may be operated on a single one of the client computing devices $106_{1-N}$. In some implementations, one or more of the message exchange clients $107_{1-N}$ may come in the form of a short messaging service ("SMS") and/or multimedia messaging service ("MMS") client, an online chat client (e.g., instant messenger, Internet relay chat, or "IRC," etc.), a messaging application associated with a social network, a personal assistant messaging service dedicated to conversations with automated assistant 120, and so forth. In some implementations, one or more of the message exchange clients $107_{1-N}$ may be implemented via a webpage or other resources rendered by a web browser (not depicted) or other application of client computing device 106.

As described in more detail herein, automated assistant 120 engages in human-to-computer dialog sessions with one or more users via user interface input and output devices of one or more client devices $106_{1-N}$. In some implementations, automated assistant 120 may engage in a human-to-computer dialog session with a user in response to user interface input provided by the user via one or more user interface input devices of one of the client devices $106_{1-N}$. In some of those implementations, the user interface input is explicitly directed to automated assistant 120. For example, one of the message exchange clients $107_{1-N}$ may be a personal assistant messaging service dedicated to conversations with automated assistant 120 and user interface input provided via that personal assistant messaging service may be automatically provided to automated assistant 120. Also, for example, the user interface input may be explicitly directed to automated assistant 120 in one or more of the message exchange clients $107_{1-N}$ based on particular user interface input that indicates automated assistant 120 is to be invoked. For instance, the particular user interface input may be one or more typed characters (e.g., @AutomatedAssistant), user interaction with a hardware button and/or virtual button (e.g., a tap, a long tap), an oral command (e.g., "Hey Automated Assistant"), and/or other particular user interface input.

In some implementations, automated assistant 120 may engage in a dialog session in response to user interface input, even when that user interface input is not explicitly directed to automated assistant 120. For example, automated assistant 120 may examine the contents of user interface input and engage in a dialog session in response to certain terms being present in the user interface input and/or based on other cues. In many implementations, automated assistant 120 may engage interactive voice response ("IVR"), such that the user can utter commands, searches, etc., and the automated assistant may utilize natural language processing and/or one or more grammars to convert the utterances into text, and respond to the text accordingly. In some implementations, the automated assistant 120 can additionally or alternatively respond to utterances without converting the utterances into text. For example, the automated assistant 120 can convert voice input into an embedding, into entity representation(s) (that indicate entity/entities present in the voice input), and/or other "non-textual" representation and operate on such non-textual representation. Accordingly, implementations described herein as operating based on text converted from voice input may additionally and/or alternatively operate on the voice input directly and/or other non-textual representations of the voice input.

Each of the client computing devices $106_{1-N}$ and computing device(s) operating cloud-based automated assistant components 119 may include one or more memories for storage of data and software applications, one or more processors for accessing data and executing applications, and other components that facilitate communication over a network. The operations performed by one or more of the client computing devices $106_{1-N}$ and/or by automated assistant 120 may be distributed across multiple computer systems. Automated assistant 120 may be implemented as, for example, computer programs running on one or more computers in one or more locations that are coupled to each other through a network.

As noted above, in various implementations, each of the client computing devices $106_{1-N}$ may operate an automated assistant client 118. In various embodiments, each automated assistant client 118 may include a corresponding speech capture/text-to-speech ("TTS")/STT module 114. In other implementations, one or more aspects of speech capture/TTS/STT module 114 may be implemented separately from automated assistant client 118.

Each speech capture/TTS/STT module 114 may be configured to perform one or more functions: capture a user's speech, e.g., via a microphone (which in some cases may comprise presence sensor 105); convert that captured audio to text (and/or to other representations or embeddings); and/or convert text to speech. For example, in some implementations, because a client device 106 may be relatively constrained in terms of computing resources (e.g., processor cycles, memory, battery, etc.), the speech capture/TTS/STT module 114 that is local to each client device 106 may be configured to convert a finite number of different spoken phrases—particularly phrases that invoke automated assistant 120 and/or intercom-style communication—to text (or to other forms, such as lower dimensionality embeddings). Other speech input may be sent to cloud-based automated assistant components 119, which may include a cloud-based TTS module 116 and/or a cloud-based STT module 117.

In some implementations, components that contribute to implementation of intercom-style communication as described herein may intentionally be operated exclusively on one or more client devices 106 that are associated with each other, for instance, by virtue of being on the same LAN. In some such implementations, any machine learning models described elsewhere herein may be trained and/or stored on one or more client devices 106, e.g., behind an Internet firewall, so that training data and other information generated by or associated with the machine learning models may be maintained in privacy. And in some such implementations, the cloud-based STT module 117, cloud-based TTS module 116, and/or cloud-based aspects of natural language processor 122 may not be involved in invocation of intercom-style communications.

Cloud-based STT module 117 may be configured to leverage the virtually limitless resources of the cloud to convert audio data captured by speech capture/TTS/STT module 114 into text (which may then be provided to natural language processor 122). Cloud-based TTS module 116 may be configured to leverage the virtually limitless resources of the cloud to convert textual data (e.g., natural language responses formulated by automated assistant 120) into computer-generated speech output. In some implementations, TTS module 116 may provide the computer-generated speech output to client device 106 to be output directly, e.g., using one or more speakers. In other implementations, textual data (e.g., natural language responses) generated by automated assistant 120 may be provided to speech capture/TTS/STT module 114, which may then convert the textual data into computer-generated speech that is output locally.

Automated assistant 120 (and in particular, cloud-based automated assistant components 119) may include a natural language processor 122, the aforementioned TTS module 116, the aforementioned STT module 117, and other components, some of which are described in more detail below. In some implementations, one or more of the engines and/or modules of automated assistant 120 may be omitted, combined, and/or implemented in a component that is separate from automated assistant 120. And as noted above, in some implementations, to protect privacy, one or more of the components of automated assistant 120, such as natural language processor 122, speech capture/TTS/STT module 114, etc., may be implemented at least on part on client devices 106 (e.g., to the exclusion of the cloud). In some such implementations, speech capture/TTS/STT module 114 may be sufficiently configured to perform selected aspects of the present disclosure to enable intercom-style communication, while in some cases leaving other, non-intercom-related natural language processing aspects to cloud-based components when suitable.

In some implementations, automated assistant 120 generates responsive content in response to various inputs generated by a user of one of the client devices $106_{1-N}$ during a human-to-computer dialog session with automated assistant 120. Automated assistant 120 may provide the responsive content (e.g., over one or more networks when separate from a client device of a user) for presentation to the user as part of the dialog session. For example, automated assistant 120 may generate responsive content in in response to free-form natural language input provided via one of the client devices $106_{1-N}$. As used herein, free-form input is input that is formulated by a user and that is not constrained to a group of options presented for selection by the user.

As used herein, a "dialog session" may include a logically-self-contained exchange of one or more messages between a user and automated assistant 120 (and in some cases, other human participants). Automated assistant 120 may differentiate between multiple dialog sessions with a user based on various signals, such as passage of time between sessions, change of user context (e.g., location, before/during/after a scheduled meeting, etc.) between sessions, detection of one or more intervening interactions between the user and a client device other than dialog between the user and the automated assistant (e.g., the user switches applications for a while, the user walks away from then later returns to a standalone voice-activated product), locking/sleeping of the client device between sessions, change of client devices used to interface with one or more instances of automated assistant 120, and so forth.

Natural language processor 122 of automated assistant 120 processes natural language input generated by users via client devices $106_{1-N}$ and may generate annotated output for use by one or more other components of automated assistant 120. For example, the natural language processor 122 may process natural language free-form input that is generated by a user via one or more user interface input devices of client device $106_1$. The generated annotated output includes one or more annotations of the natural language input and optionally one or more (e.g., all) of the terms of the natural language input.

In some implementations, the natural language processor 122 is configured to identify and annotate various types of grammatical information in natural language input. For example, the natural language processor 122 may include a part of speech tagger configured to annotate terms with their grammatical roles. For example, the part of speech tagger may tag each term with its part of speech such as "noun," "verb," "adjective," "pronoun," etc. Also, for example, in some implementations the natural language processor 122 may additionally and/or alternatively include a dependency parser (not depicted) configured to determine syntactic relationships between terms in natural language input. For example, the dependency parser may determine which terms modify other terms, subjects and verbs of sentences, and so forth (e.g., a parse tree)—and may make annotations of such dependencies.

In some implementations, the natural language processor 122 may additionally and/or alternatively include an entity tagger (not depicted) configured to annotate entity references in one or more segments such as references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. For example, a "banana" node may be connected (e.g., as a child) to a "fruit" node," which in turn may be connected (e.g., as a child) to "produce" and/or "food" nodes. As another example, a restaurant called "Hypothetical Café" may be represented by a node that also includes attributes such as its address, type of food served, hours, contact information, etc. The "Hypothetical Café" node may in some implementations be connected by an edge (e.g., representing a child-to-parent relationship) to one or more other nodes, such as a "restaurant" node, a "business" node, a node representing a city and/or state in which the restaurant is located, and so forth.

The entity tagger of the natural language processor 122 may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

In some implementations, the natural language processor 122 may additionally and/or alternatively include a coreference resolver (not depicted) configured to group, or "cluster," references to the same entity based on one or more contextual cues. For example, the coreference resolver may be utilized to resolve the term "there" to "Hypothetical Café" in the natural language input "I liked Hypothetical Café last time we ate there."

In some implementations, one or more components of the natural language processor 122 may rely on annotations from one or more other components of the natural language processor 122. For example, in some implementations the named entity tagger may rely on annotations from the coreference resolver and/or dependency parser in annotating all mentions to a particular entity. Also, for example, in some implementations the coreference resolver may rely on annotations from the dependency parser in clustering references to the same entity. In some implementations, in processing a particular natural language input, one or more components of the natural language processor 122 may use related prior input and/or other related data outside of the particular natural language input to determine one or more annotations.

In various implementations, cloud-based automated assistant components 119 may include an intercom communication analysis service ("ICAS") 138 and/or an intercom communication location service ("ICLS") 140. In other implementations, services 138 and/or 140 may be implemented separately from cloud-based automated assistant components 119, e.g., on one or more client devices 106 and/or on another computer system (e.g., in the so-called "cloud").

In various implementations, ICAS 138 may be configured to determine, based on a variety of signals and/or data points, how and/or when to facilitate intercom-style communication between multiple users using multiple client devices 106. For example, in various implementations, ICAS 138 may be configured to analyze voice input provided by a first user at a microphone of a client device 106 of a plurality of associated client devices $106_{1-N}$. In various implementations, ICAS 138 may analyze the first user's voice input and determine, based on the analysis, that the voice input contains a message intended for a second user.

Various techniques may be employed as part of the analysis to determine whether the first user intended to convey a message to the second user. In some implementations, an audio recording of the first user's voice input may be applied as input across a trained machine learning classifier to generate output. The output may indicate that the first user's voice input contained a message intended for the second user. Various types of machine learning classifiers (or more generally, "models") may be trained to provide such output, including but not limited to various types neural networks (e.g., feed-forward, convolutional, etc.).

In some implementations, labeled phonemes of user's utterances may be used to train a machine learning model such as a neural network to learn embeddings of utterances into lower dimensionality representations. These embeddings, which may include lower dimensionality representations of the original phonemes, may then be used (e.g., as input for the trained model) to identify when a user intends to use the intercom-style communication described herein, and/or when a user's utterance contains a message intended for another person. For example, labeled utterances may be embedded into reduced dimensionality space, e.g., such that they are clustered into groups associated with intercom-style communication and not-intercom-style communication. The new, unlabeled utterance may then be embedded, and may be classified based on which cluster it's embedding is nearest (e.g., in Euclidian space).

In some implementations, a neural network (or other classifier) may be trained using training data in the form of a corpus of labelled user utterances (in which case the training is "supervised"). Labels applied to the corpus of utterances may include, for instance, a first label indicative of an utterance that contains a message intended for another user, a second label indicative of a command to engage in a human-to-computer dialog with automated assistant 120, and/or a third label indicative of background noise (which may be ignored). The labelled training examples may be applied as input to an untrained neural network. Differences between the output of the untrained (or not fully-trained) neural network and the labels—a.k.a. error—may be determined and used with techniques such as back propagation, stochastic gradient descent, objective function optimization, etc., to adjust various weights of one or more hidden layers of the neural network to reduce the error.

As noted in the background, machine learning classifiers such as neural networks may be trained already to recognize (e.g., classify) phonemes or other audio characteristics of utterances that are intended to invoke automated assistant 120. In some implementations, the same classifier may be trained further to both recognize (e.g., classify) explicit invocation of automated assistant 120, and to determine whether an utterance contains a message intended for a second user. In other implementations, separate machine learning classifiers may be used for each of these two tasks, e.g., one after the other or in parallel.

In addition to determining that a captured (recorded) utterance contains a message intended for another user, it may be determined also whether intercom-style communication is warranted, e.g., based on respective locations of the speaker and the intended recipient. In various implementations, ICLS 140 may determine a location of the intended recipient relative to the plurality of client devices $106_{1-N}$, e.g., using presence sensor(s) 105 associated with one or more of the client devices $106_{1-N}$. For example, ICLS 140 may determine which client device 106 is nearest the intended recipient, and/or which room the intended recipient is in (which in some cases may be associated with a client device deployed in that room). Based on the location of the intended recipient determined by ICLS 140, in various implementations, ICAS 138 may select, from the plurality of client devices $106_{1-N}$, a second client device 106 that is capable of providing audio or visual output that is perceptible to the intended recipient. For example, if the intended recipient was last detected walking into a particular area, then a client device 106 nearest that area may be selected.

In some implementations, ICLS 140 may be provided, e.g., as part of cloud-based automated assistant components 119 and/or separately therefrom. In other implementations, ICAS 138 and ICLS 140 may be implemented together in a single model or engine. In various implementations, ICLS 140 may be configured to track locations of persons within an area of interest, such as within a home, a workplace, a campus, etc., based on signals provided by, for example, presence sensors 105 integral with a plurality of client devices $106_{1-N}$ that are distributed throughout the area. Based on these tracked locations, ICLS 140 and/or ICAS 138 may be configured to facilitate intercom-style communication between persons in the area using the plurality of client devices $106_{1-N}$ as described herein.

In some implementations, ICLS 140 may create and/or maintain a list or database of persons located in a particular area, and/or their last known locations relative to a plurality of client devices $106_{1-N}$ deployed in the area. In some implementations, this list/database may be updated, e.g., in real time, as persons are detected by different client devices as having moved to different locations. For example, ICLS 140 may drop a particular person from the list/database if, for example, that person is not detected in the overall area for some predetermined time interval (e.g., one hour) and/or if the person is last detected passing through an ingress or egress area (e.g., front door, back door, etc.). In other implementations, ICLS 140 may update the list/database periodically, e.g., every few minutes, hours, etc.

In some implementations, ICAS 138 and/or ICLS 140 (and more generally, automated assistant 120) may be configured to distinguish between different people using signals from presence sensors 105, rather than simply detect presence of a generic person. For example, suppose a client device 106 includes a microphone as a presence sensor 105. Automated assistant 120 may be configured to use a variety of speaker recognition and/or voice recognition techniques to determine not only that someone is present nearby, but who is present. These speaker recognition and/or voice recognition techniques may include but are not limited to hidden Markov models, Gaussian mixture models, frequency estimation, trained classifiers, deep learning, pattern matching algorithms, matrix representation, vector quantization, decisions trees, etc.

If a person near a microphone-equipped client device 106 does not happen to be speaking, then other techniques may be employed to identify the person. Suppose a client device 106 includes, as a presence sensor 105, a camera and/or a PIR sensor. In some implementations, a machine learning visual recognition classifier may be trained using labelled training data captured by such a presence sensor 105 to recognize the person visually. In some implementations, a user may cause the visual recognition classifier to be trained by invoking a training routine at one or more camera/PIR sensor-equipped client devices 106. For example, a user may stand in a field of view of presence sensor 105 and invoke automated assistant 120 with a phrase such as "Hey Assistant, I am Jan and this is what I look like." In some implementations, automated assistant 120 may provide audible or visual output that prompts the user to move around to various positions within a field of view of presence sensor 105, while presence sensor 105 captures one or more snapshots of the user. These snapshots may then be labelled (e.g., with "Jan") and used as labelled training examples for supervised training of the visual recognition classifier. In other implementations, labelled training examples for visual recognition may be generated automatically, e.g., without the user being aware. For example, when the user is in a field of view of presence sensor 105, a signal (e.g., radio wave, ultrasonic) emitted by a mobile client device 106 carried by the user may be analyzed, e.g., by automated assistant 120, to determine the user's identity (and hence, a label) for snapshots captured by presence sensor 105.

And in yet other implementations, other types of cues besides audio and/or visual cues may be employed to distinguish uses from one another. For example, radio, ultrasonic, and/or other types of wireless signals (e.g., infrared, modulated light, etc.) emitted by client devices 106 carried by users may be analyzed, e.g., by automated assistant 120, to discern an identity of a nearby user. In some implementations, a user's mobile client device 106 may include a network identifier, such as "Jan's Smartphone," that may be used to identify the user.

Figure 1B:
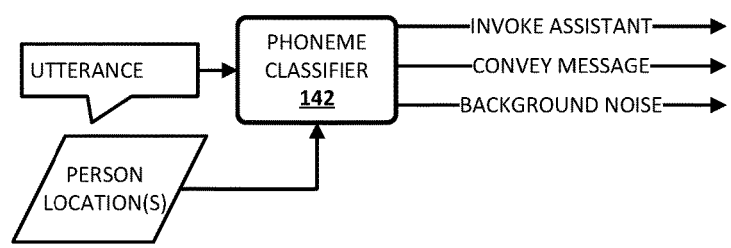
FIG. 1B schematically depicts one example of how a trained classifier may be applied to generate output based on user utterances and/or locations, in accordance with various implementations.

Referring now to FIG. 1B, an example data flow is depicted schematically to demonstrate one possible way in which a trained machine learning classifier may be applied to analyze user utterances and determine, among other things, whether to employ intercom-style communication. In FIG. 1B, a phoneme classifier 142 (which may be a component of automated assistant 120) may be trained such that one or more utterances and one or more person locations may be applied across phoneme classifier 142 as input. Phoneme classifier 142 may then generate, as output, a classification of the utterance(s). In FIG. 1B, these classifications include "invoke assistant," "convey message," and "background noise," but additional and/or alternative labels are possible.

Conventional phoneme classifiers already exist that detect explicit invocation phrases such as "Hey, Assistant," "OK Assistant," etc. In some implementations, phoneme classifier 142 may include the same functionality such that when an input utterance includes such an invocation phrase, the output of phoneme classifier 142 is "invoke assistant." Once automated assistant 120 is invoked, the user may engage in human-to-computer dialog with automated assistant 120 as is known in the art.

However, in some implementations, phoneme classifier 142 may be further trained to recognize other phonemes that signal a user intent to convey a message to another user. For example, users may often use phrases such as "Hey, <name>" to get another person's attention. More generally, phoneme classifier 142 may operate to match custom phrases, words, etc. Additionally or alternatively, to get another person's attention, it may be common to first speak the other person's name, sometimes in a slightly elevated volume and/or with particular intonations, or to use other types of intonations. In various implementations, phoneme classifier 142 may be trained to recognize such phonemes and generate output such as "convey message" to signal a scenario in which intercom-style communication may potentially be warranted. In various implementations, a separate intonation model may optionally be separately trained to recognize utterances that seek communication with another person (e.g., to differentiate such utterances from casual utterances) and generate output that indicates the presence of such utterances (e.g., a likelihood that such an utterance is present). The outputs from the phoneme classifier and the intonation model, for a given user utterance, may be collectively considered in determining if intercom-style communication may be warranted.

In some implementations, one or more person locations may be provided, e.g., by ICLS 140, as input to phoneme classifier 142. These person locations may be used, in addition to or instead of the utterance(s), to determine whether intercom-style communication is warranted. For example, if the recipient location is sufficiently near (e.g., within earshot of) a speaker's location, that may influence phoneme classifier 142 to produce output such as "background noise," even if the utterance contains a message intended for another. On the other hand, suppose the intended recipient's location is out of earshot of the speaker's location. That may influence phoneme classifier 142 to produce output such as "convey message," which may increase a likelihood that intercom-style communication is employed. Additionally or alternatively, a two-step approach may be implemented in which it is first determined whether a speaker's utterance contains a message intended for another user, and it is then determined whether the other user is within earshot of the speaker. If the answer to both questions is yes, then intercom-style communication may be implemented to convey the message to the intended recipient.

Figure 2:
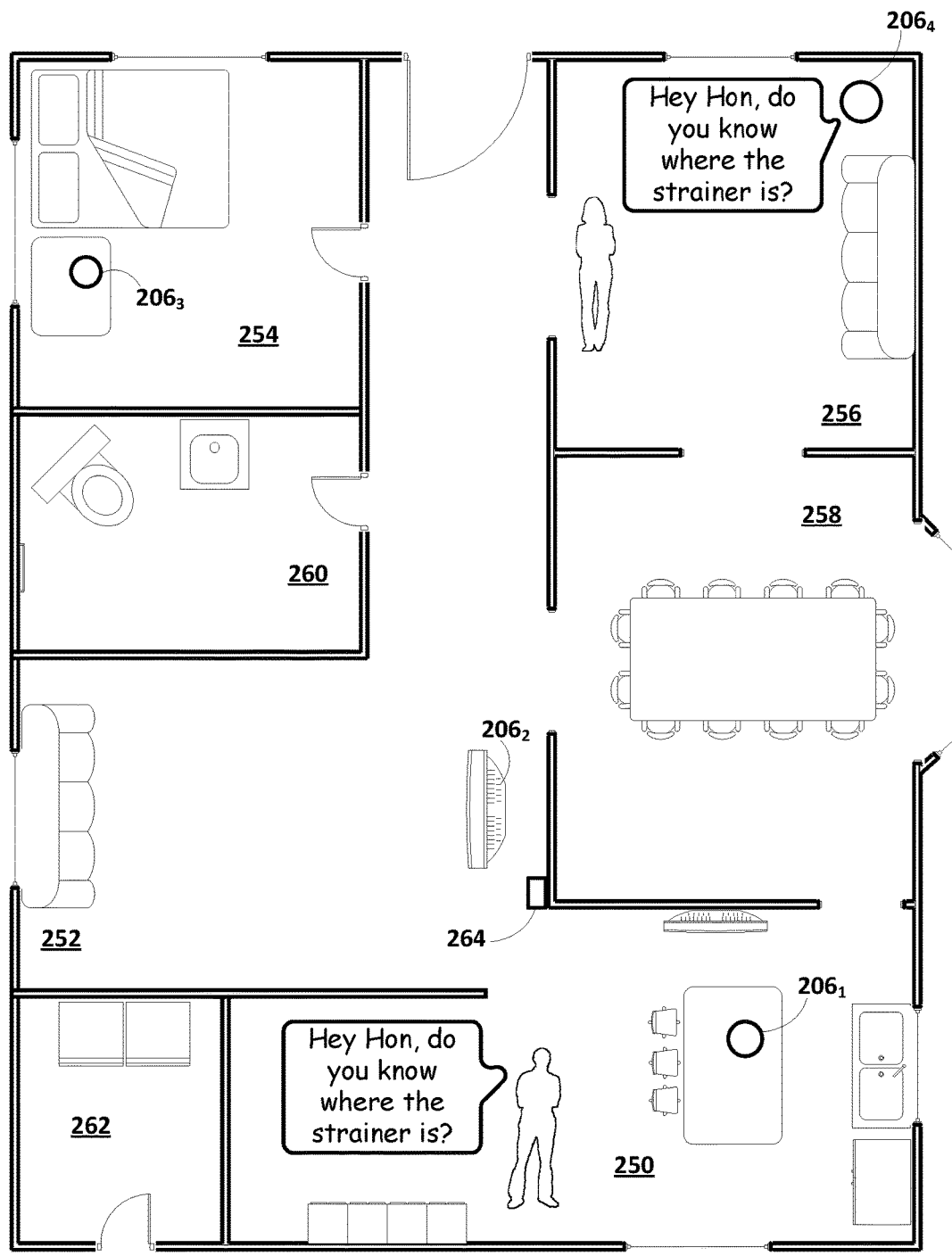
FIGS. 2, 3, and 4 depict example dialogs between various users and automated assistants, including intercom-style communications, in accordance with various implementations.

Referring now to FIG. 2, a home floorplan is depicted that includes a plurality of rooms, 250-262. A plurality of client devices $206_{1-4}$ are deployed throughout at least some of the rooms. Each client device 206 may implement an instance of automated assistant client 118 configured with selected aspects of the present disclosure and may include one or more input devices, such as microphones, that are capable of capturing utterances spoken by a person nearby. For example, a first client device $206_1$ taking the form of a standalone interactive speaker is deployed in room 250, which in this example is a kitchen. A second client device $206_2$ taking the form of a so-called "smart" television (e.g., a networked television with one or more processors that implement an instance of automated assistant client 118) is deployed in room 252, which in this example is a den. A third client device $206_3$ taking the form of an interactive standalone speaker is deployed in room 254, which in this example is a bedroom. A fourth client device $206_4$ taking the form of another interactive standalone speaker is deployed in room 256, which in this example is a living room.

While not depicted in FIG. 2, the plurality of client devices 106$_{1-4}$ may be communicatively coupled with each other and/or other resources (e.g., the Internet) via one or more wired or wireless LANs (e.g., 110$_2$ in FIG. 1A). Additionally, other client devices—particularly mobile devices such as smart phones, tablets, laptops, wearable devices, etc.—may also be present, e.g., carried by one or more persons in the home and may or may not also be connected to the same LAN. It should be understood that the configuration of client devices depicted in FIG. 2 and elsewhere in the Figures is just one example; more or less client devices 106 may be deployed across any number of other rooms and/or areas other than a home.

In the example of FIG. 2, a first user, Jack, is in the kitchen 250 when he utters the question, "Hey Hon, do you know where the strainer is?" Perhaps unbeknownst to Jack, his wife, Jan, is not in kitchen 250, but rather is in living room 256, and therefore likely did not hear Jack's question. First client device 206$_1$, which as noted above is configured with selected aspects of the present disclosure, may detect Jack's utterance. A recording of the utterance may be analyzed using techniques described above to determine that Jack's utterance contains a message intended for Jan. First client device 206$_1$ also may determine, e.g., based on information shared amongst all of the plurality of client devices 206$_{1-4}$, that Jan is in living room 256 (or at least nearest fourth client device 206$_4$). For example, client device 206$_4$ may have detected, e.g., using one or more integral presence sensors (e.g., 105 in FIG. 1A), that Jan is in living room 256.

Based on Jan's detected location and/or on attribute(s) of Jack's utterance (which in some implementations may be classified using a trained machine learning model as described above), first client device 206$_1$ may determine that Jack intended his message for Jan and that Jan is out of earshot of Jack. Consequently, first client device 206$_1$ may push (over one or more of the aforementioned LANs) a recording of Jack's utterance (or in some cases, transcribed text of Jack's utterance) to the client device nearest Jan, which in this example is fourth client device 206$_4$. On receiving this data, fourth client device 206$_4$ may, e.g., by way of automated assistant 120 executing at least in part on fourth client device 206$_4$, audibly output Jack's message to Jan as depicted in FIG. 2, thus effecting intercom-style communication between Jack and Jan.

In the example of FIG. 2 (and in similar examples described elsewhere herein), Jack's question is output to Jan audibly using fourth client device 206$_4$, which as noted above is a standalone interactive speaker. However, this is not meant to be limiting. In various implementations, Jack's message may be conveyed to Jan using other output modalities. For example, in some implementations in which a mobile client device (not depicted) carried by Jan is connected to the Wi-Fi LAN, that mobile device may output Jack's message, either as an audible recording or as a textual message that is conveyed to Jan visually, e.g., using an application such as message exchange client 107 executing on Jan's mobile client device.

In various implementations, recordings and/or STT transcriptions of utterances that are exchanged between client devices 106 to facilitate intercom communication may be used for a variety of additional purposes. In some embodiments, they may be used to provide context to downstream human-to-computer dialogs between user(s) and automated assistant 120. For example, in some scenarios, a recorded utterance and/or its STT transcription may be used to disambiguate a request provided to an instance of automated assistant 120, whether that request be from the user who originally provided the utterance, an intended recipient of the utterance, or even another user who engages automated assistant 120 subsequent to an intercom-style communication involving a plurality of client devices 106.

Figure 3:
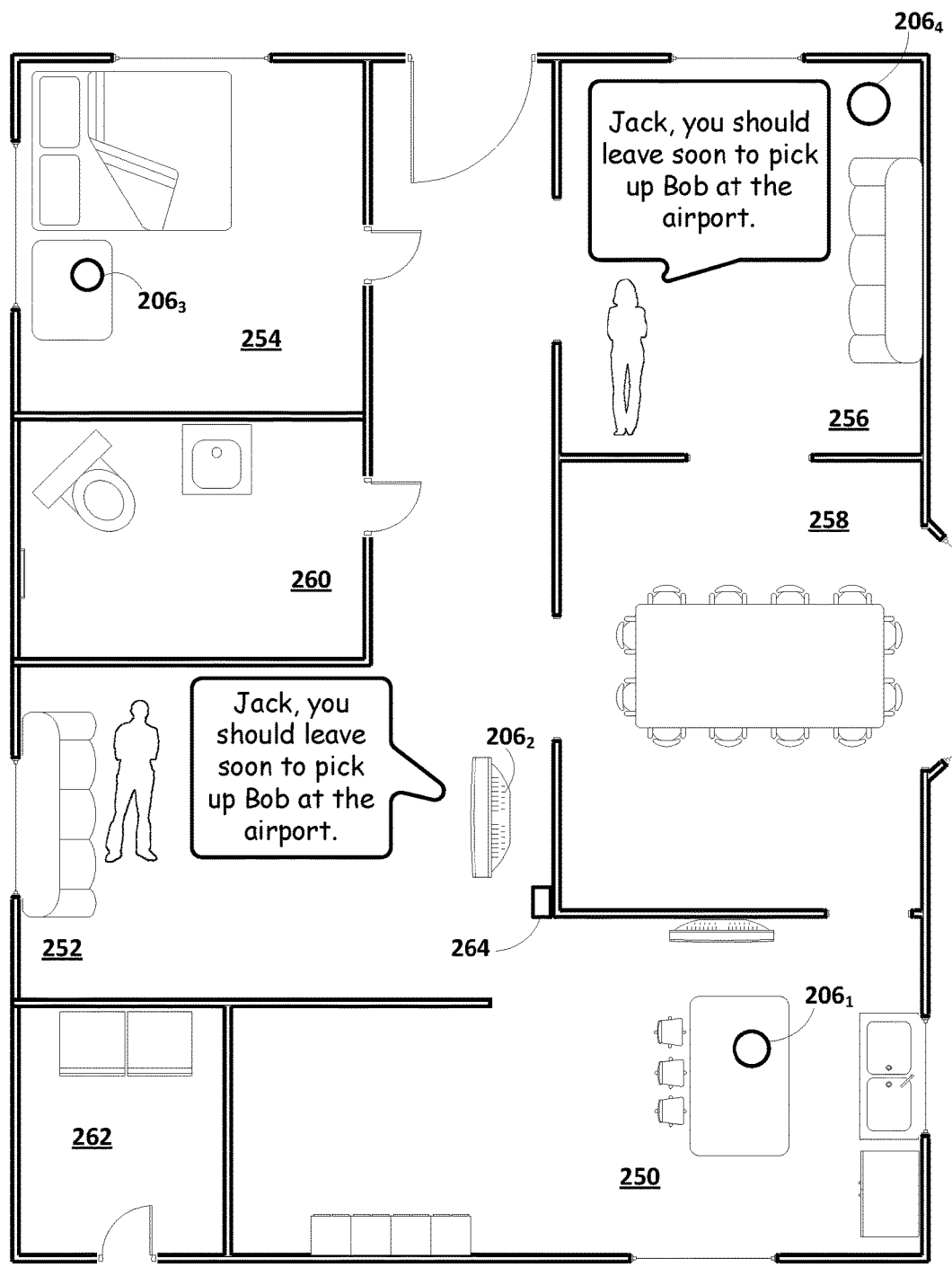

FIG. 3 depicts the same home and distribution of client devices 206$_{1-4}$ as was depicted in FIG. 2. In FIG. 3, Jan (still in living room 256) speaks the utterance, "Hey Jack, you should leave soon to pick up Bob from the airport." It may be determined, e.g., by ICLS 140, that Jack is in another room, out of earshot from Jan. For example, ICLS 140 may determine, e.g., based on a signal provided by an onboard camera and/or PIR sensor of a "smart" thermostat 264, that Jack is located in den 252. Based on that determination, and/or a determination that Jan's utterance has been classified (e.g., using one of the aforementioned machine learning models) as a message intended for Jack, a client device near Jack's detected location, such as client device 206$_2$, may be identified to output Jan's utterance. In some implementations, Jan's recorded utterance may be pushed from another computing device near Jan that recorded it, such as client device 206$_4$, to client device 206$_2$ identified near Jack and output audibly (or visually since client device 206$_2$ is a smart television with display capabilities).

Figure 4:
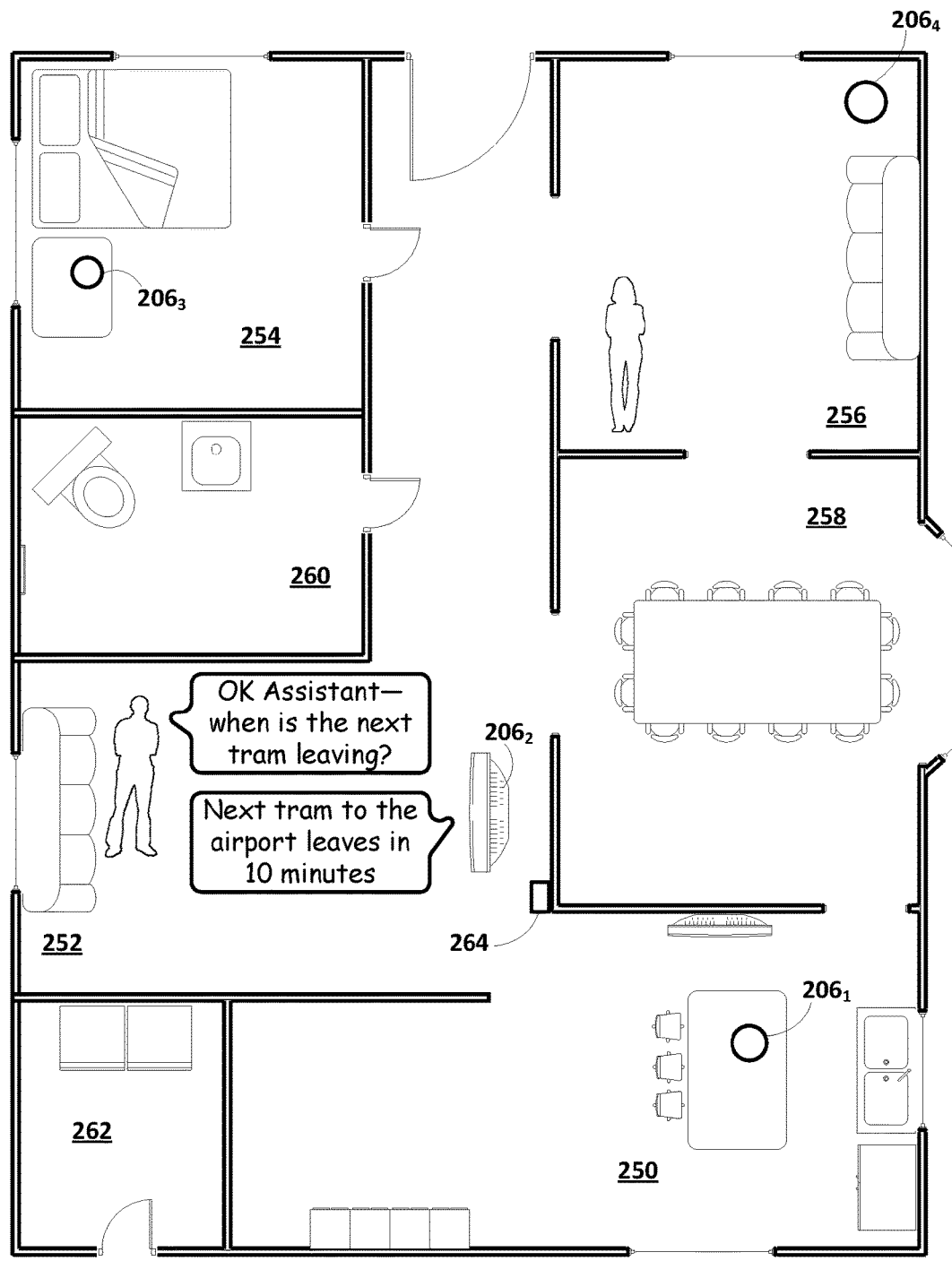

FIG. 4 demonstrates an example follow up scenario to that depicted in FIG. 3. After receiving Jan's conveyed message via client device 206$_2$, Jack says "OK Assistant—when is the next tram leaving?" Without additional information, this request, or search query, may be too ambiguous to answer, and automated assistant 120 may be required to solicit disambiguating information from Jack. However, using techniques described herein, automated assistant 120 may disambiguate Jack's request based on Jan's original utterance to determine that the tram to the airport is the one Jack is interested in. Additionally or alternatively, automated assistant 120 could simply retrieve normal results for all nearby trams, and then rank those results based on Jack's utterance, e.g., so that the tram to the airport is ranked highest. Whichever the case, in FIG. 4, automated assistant 120 provides audio output at client device 206$_2$ of "Next tram to the airport leaves in 10 minutes."

Figure 5:
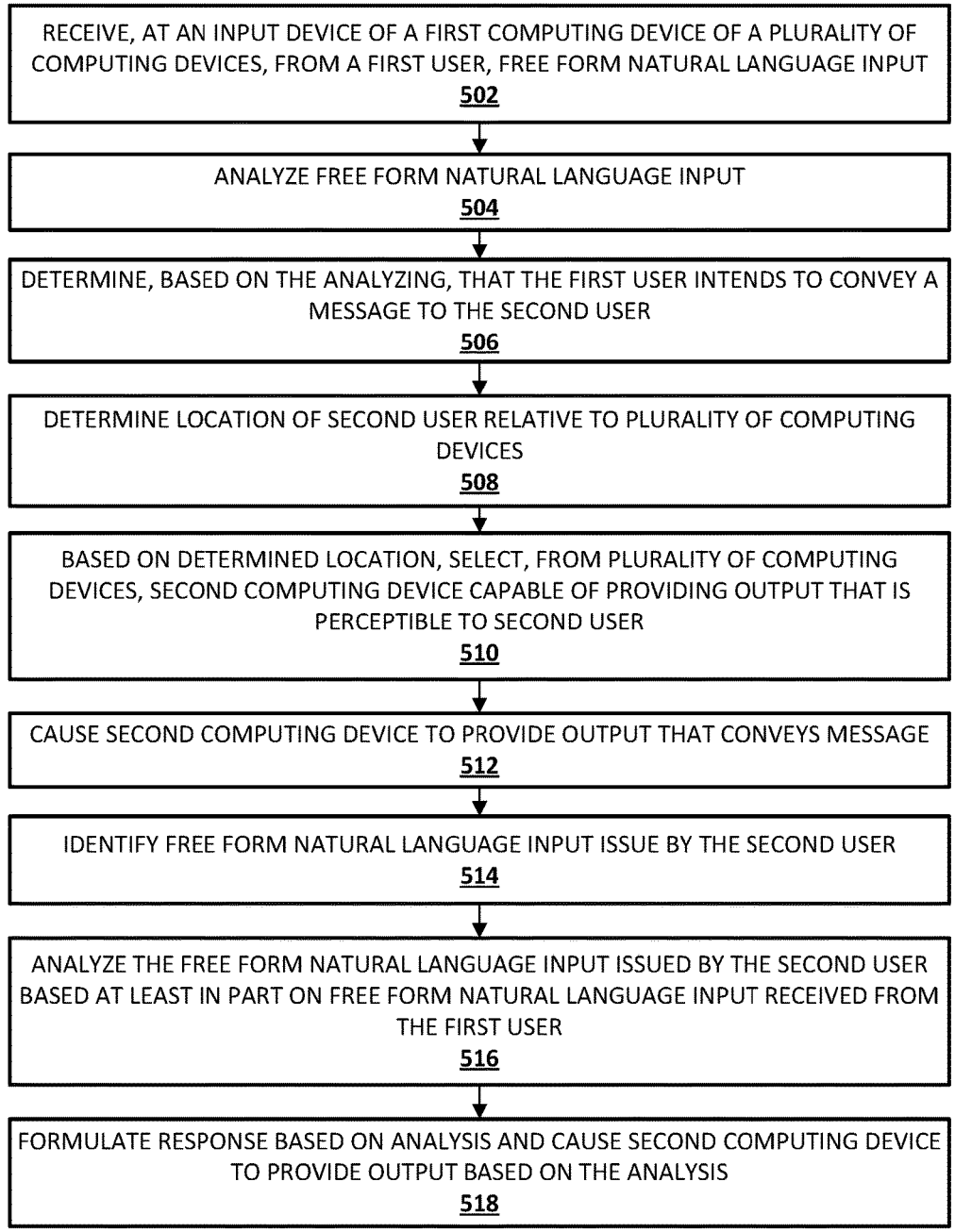
FIG. 5 depicts a flowchart illustrating an example method according to implementations disclosed herein.

FIG. 5 is a flowchart illustrating an example method 500 according to implementations disclosed herein. For convenience, the operations of the flow chart are described with reference to a system that performs the operations. This system may include various components of various computer systems, such as one or more components of computing systems that implement automated assistant 120. Moreover, while operations of method 500 are shown in a particular order, this is not meant to be limiting. One or more operations may be reordered, omitted or added.

At block 502, the system may receive, at an input device of a first computing device of a plurality of computing devices, from a first user, free form natural language input. In many implementations, this free form natural language input may come in the form of voice input, i.e., an utterance from the first user, though this is not required. It should be understood that this voice input need not necessarily be directed by the first user at automated assistant 120, and instead may include any utterance provided by the first user that is captured and/or recorded by a client device configured with selected aspects of the present disclosure.

At block 504, the system may analyze the voice input. Various aspects (e.g., phonemes) of the voice input may be analyzed, including but not limited to intonation, volume, recognized phrases, etc.

In some implementations, the system may analyze other signals in addition to the voice input. These other signals may include, for instance, a number of people in an environment such as a house. For instance, if only one person is present, no intercom capabilities may be utilized. If only two people are present, then the location of the other person may automatically be determined to be the location at which intercom output should be provided. If more than two people are present, then the system may attempt various techniques (e.g., voice recognition, facial recognition, wireless signal recognition, etc.) to attempt to distinguish people from each other.

At block 506, the system may determine, based on the analyzing, that the first user intends to convey a message to a second user (e.g., that the voice input contains a message intended for the second user). As described previously, automated assistant 120 may employ various techniques, such as a classifier trained on labeled training examples in the form of recorded utterances, to analyze the voice input and/or determine whether the first user's voice input is a command to invoke automated assistant 120 (e.g., "Hey, Assistant") to engage in further human-to-computer dialog, an utterance intended to convey a message to the second user (or multiple other users), or other background noise. In some implementations, in addition to or instead of a trained machine learning model, a rules-based approach may be implemented. For example, one or more simple IVR grammars may be defined, e.g., using technologies such as voice extensible markup language, or "VXML," that are designed to match utterances that are intended to convey messages between users.

At block 508 (which may occur after blocks 502-506 or on an ongoing basis), the system may determine a location of the second user relative to the plurality of computing devices. In some embodiments, ICLS 140 may maintain a list or database of people in an area such as a home or workplace and their last-known (i.e., last-detected) locations. In some such implementations, the system may simply consult this list or database for the second user's location. In other implementations, the system may actively poll a plurality of client devices in the environment to seek out the second user, e.g., on an as-needed basis (e.g., when it is determined that the first user's utterance contains a message intended to be conveyed to the second user). This may cause the client devices to activate presence sensors (105 in FIG. 1A) so that they can detect whether someone (e.g., the second user) is nearby.

At block 510 the system may select, from the plurality of computing devices, based on the location of the second user, a second computing device that is capable of providing audio or visual output that is perceptible to the second user. In some implementations, the second computing device may be a stationary client device (e.g., a standalone interactive speaker, smart television, desktop computer, etc.) that is deployed in a particular area of an environment. In other implementations, the second computing device may be a mobile client device carried by the second user. In some such implementations, the mobile client device may become part of the plurality of computing devices considered by the system by virtue of being part of the same coordinate ecosystem and/or joining the same wireless LAN (or simply being located within a predetermined distance).

At block 512, the system may cause the second computing device identified at block 510 to provide audio or visual output that conveys the message to the second user. For example, in some implementations in which ICAS 138 and/or ICLS 140 are cloud-based, one or the other may cause a recording of the first user's utterance to be forwarded (e.g., streamed) to the second computing device selected at block 510. The second computing device, which may be configured with selected aspects of the present disclosure, may respond by outputting the forwarded recording.

While examples described herein have included a first user attempting to convey a message to a single other user, this is not meant to be limiting. In various implementations, a user's utterance may be intended for multiple other users, such as multiple members of the speaker's family, all persons in the area or environment, etc. In some such implementations, one or more of the aforementioned machine learning classifiers may be (further) trained to determine whether an utterance contains a message intended for a single recipient or multiple recipients. If the answer is yes, then the system may convey the message to the multiple intended recipients at multiple locations in various ways. In some simple implementations, the system may simply cause the message to be pushed to all client devices in the area (e.g., all client devices of a coordinated ecosystem and/or all client devices connected to a Wi-Fi LAN), effectively broadcasting the message. In other implementations, the system (e.g., ICLS 140) may determine locations of all intended recipients on an individual basis, and output the message on only those client devices that are near each intended recipient.

In some implementations, automated assistant 120 may wait until an intended recipient of a message is able to perceive a message (e.g., within earshot) until it causes a message to be conveyed using techniques described herein. For example, suppose a first user conveys a message to an intended recipient but the intended recipient has stepped outside momentarily. In some implementations, the message may be temporarily delayed until the intended recipient is detected by one or more computing devices. The first computing device to detect the recipient upon their return may output the original message. In some implementations, a variety of signals, such as intended recipient's position coordinate (e.g., Global Positioning System, or "GPS") obtained from a mobile device they carry, may be used to determine that the intended recipient will not be reachable using intercom-style communication (at least not with any devices on the LAN). In some implementations, the message (e.g., a recording of the speaker's utterance) may be forwarded to the recipient's mobile device. In other implementations, automated assistant 120 may determine that the intended recipient is unreachable, and may provide output, e.g., at a client device closest to the speaker (e.g., the device that captured the speaker's utterance) that notifies the speaker that the recipient is unreachable at the moment. In some such implementations, automated assistant 120 may prompt the user for permission to forward the message to the recipient's mobile device, e.g., by output something like "I can't reach Jan directly right now. Would you like me to send a message to their phone?"

Optional blocks 514-518 may or may not occur if the second user issues free form natural language input sometime after the first user's message is output at block 512. At block 514, the system may identify a free form natural language input, such as a voice input, that is issued by the second user after the audio or visual output is provided by the second computing device at block 512. The second user's voice input may include, for instance, a command and/or a search query. In some embodiments, the command and/or search query may be, by itself, too ambiguous to properly interpret, as was the case with Jack's utterance in FIG. 4.

At block 516, the system may analyze the second user's free form natural language input identified at block 514 based at least in part on the free form natural language input received from the first user at block 502. In other words, the first user's utterance may be transcribed and used to provide context to the second user's subsequent request. At block 518, the system may formulate a response to the second user's natural language input based on the context provided by the first user's original free form natural language input. For example, if the second user's free form natural language input included a search query (such as Jack's query in FIG. 4), the system may obtain search results that are responsive to the search query based at least in part on the voice input from the first user. For example, the second user's search query may be disambiguated based on the first user's original utterance, and/or one or more responsive search results may be ranked based on the first user's original utterance. At block 518, the system may then cause one or more of the plurality of computing devices to provide output indicative of at least some of the search results, as occurred in FIG. 4.

In various implementations, users may preconfigure (e.g., commission) client computing devices in their home, workplace, or in another environment, to be usable to engage in intercom-style communications as described herein. For example, in some implementations, a user may, e.g., using a graphical user interface and/or by engaging in a human-to-computer dialog session with automated assistant 120, assign a "location" to each stationary client computing device, such as "kitchen," "dining room," etc. Consequently, in some such implementations, a user may explicitly invoke automated assistant 120 to facilitate intercom-style communication to a particular location. For example, a user may provide the following voice input to convey a message to another user: "Hey Assistant, tell Oliver in the kitchen that we need more butter."

More generally, in some implementations, users may explicitly designate a recipient of a message when they invoke intercom-style communication. If the user does not also specify a location of the recipient, then techniques described herein, e.g., in association with ICLS 140, may be used automatically to determine a location of the recipient and select which computing device will be used to output the message to the recipient. However, as described above, a user need not explicitly invoke intercom-style communications. Rather, as described above, various signals and/or data points (e.g., output of a machine learning classifier, location of an intended recipient, etc.) may be considered to determine, without explicit instruction from the user, that the user's message should be convey automatically using intercom-style communication.

Figure 6:
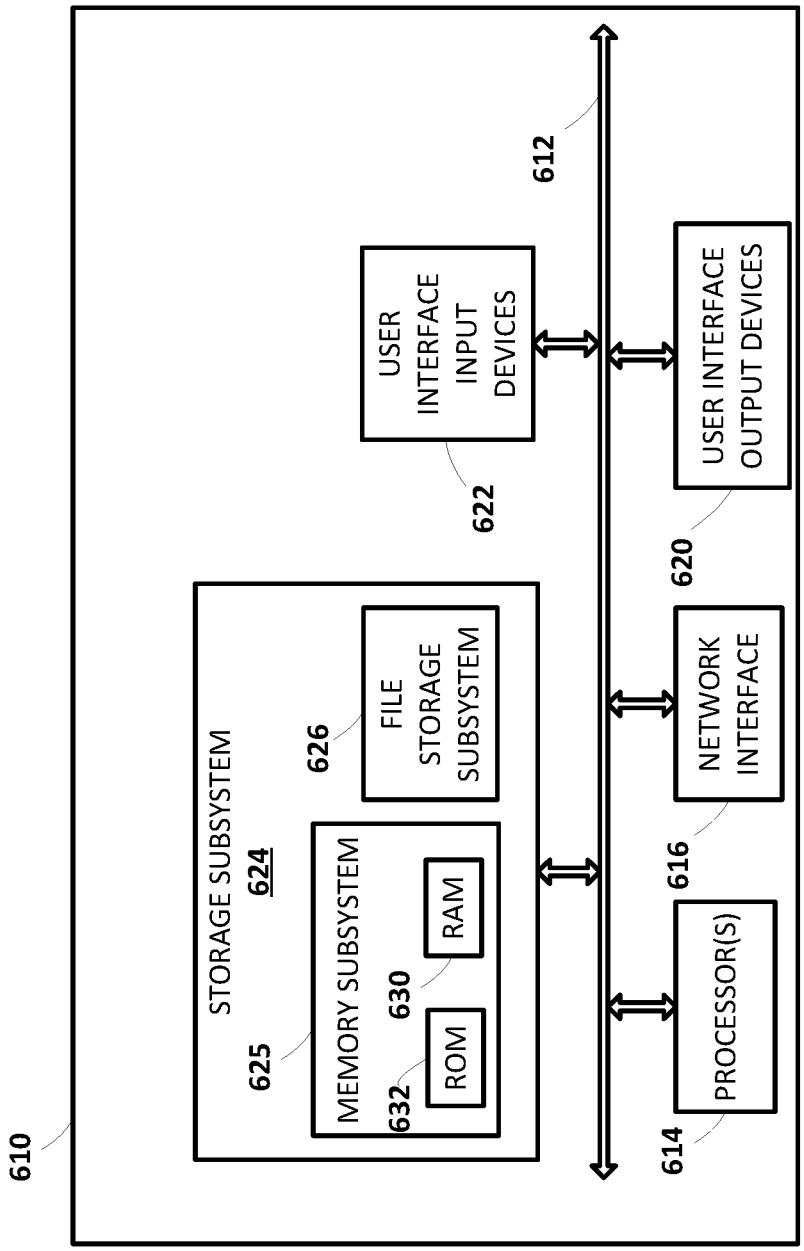
FIG. 6 illustrates an example architecture of a computing device.

FIG. 6 is a block diagram of an example computing device 610 that may optionally be utilized to perform one or more aspects of techniques described herein. In some implementations, one or more of a client computing device, user-controlled resources engine 130, and/or other component(s) may comprise one or more components of the example computing device 610.

Computing device 610 typically includes at least one processor 614 which communicates with a number of peripheral devices via bus subsystem 612. These peripheral devices may include a storage subsystem 624, including, for example, a memory subsystem 625 and a file storage subsystem 626, user interface output devices 620, user interface input devices 622, and a network interface subsystem 616. The input and output devices allow user interaction with computing device 610. Network interface subsystem 616 provides an interface to outside networks and is coupled to corresponding interface devices in other computing devices.

User interface input devices 622 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 610 or onto a communication network.

User interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 610 to the user or to another machine or computing device.

Storage subsystem 624 stores programming and data constructs that provide the functionality of some or all of the modules described herein. For example, the storage subsystem 624 may include the logic to perform selected aspects of the method of FIG. 5, as well as to implement various components depicted in FIG. 1A.

These software modules are generally executed by processor 614 alone or in combination with other processors. Memory 625 used in the storage subsystem 624 can include a number of memories including a main random access memory (RAM) 630 for storage of instructions and data during program execution and a read only memory (ROM) 632 in which fixed instructions are stored. A file storage subsystem 626 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 626 in the storage subsystem 624, or in other machines accessible by the processor(s) 614.

Bus subsystem 612 provides a mechanism for letting the various components and subsystems of computing device 610 communicate with each other as intended. Although bus subsystem 612 is shown schematically as a single bus, alternative implementations of the bus subsystem may use multiple busses.

Computing device 610 can be of varying types including a workstation, server, computing cluster, blade server, server farm, or any other data processing system or computing device. Due to the ever-changing nature of computers and networks, the description of computing device 610 depicted in FIG. 6 is intended only as a specific example for purposes of illustrating some implementations. Many other configurations of computing device 610 are possible having more or fewer components than the computing device depicted in FIG. 6.

In situations in which certain implementations discussed herein may collect or use personal information about users (e.g., user data extracted from other electronic communications, information about a user's social network, a user's location, a user's time, a user's biometric information, and a user's activities and demographic information, relationships between users, etc.), users are provided with one or more opportunities to control whether information is collected, whether the personal information is stored, whether the personal information is used, and how the information is collected about the user, stored and used. That is, the systems and methods discussed herein collect, store and/or use user personal information only upon receiving explicit authorization from the relevant users to do so.

For example, a user is provided with control over whether programs or features collect user information about that particular user or other users relevant to the program or feature. Each user for which personal information is to be collected is presented with one or more options to allow control over the information collection relevant to that user, to provide permission or authorization as to whether the information is collected and as to which portions of the information are to be collected. For example, users can be provided with one or more such control options over a communication network. In addition, certain data may be treated in one or more ways before it is stored or used so that personally identifiable information is removed. As one example, a user's identity may be treated so that no personally identifiable information can be determined. As another example, a user's geographic location may be generalized to a larger region so that the user's particular location cannot be determined.

While several implementations have been described and illustrated herein, a variety of other means and/or structures for performing the function and/or obtaining the results and/or one or more of the advantages described herein may be utilized, and each of such variations and/or modifications is deemed to be within the scope of the implementations described herein. More generally, all parameters, dimensions, materials, and configurations described herein are meant to be exemplary and that the actual parameters, dimensions, materials, and/or configurations will depend upon the specific application or applications for which the teachings is/are used. Those skilled in the art will recognize, or be able to ascertain using no more than routine experimentation, many equivalents to the specific implementations described herein. It is, therefore, to be understood that the foregoing implementations are presented by way of example only and that, within the scope of the appended claims and equivalents thereto, implementations may be practiced otherwise than as specifically described and claimed. Implementations of the present disclosure are directed to each individual feature, system, article, material, kit, and/or method described herein. In addition, any combination of two or more such features, systems, articles, materials, kits, and/or methods, if such features, systems, articles, materials, kits, and/or methods are not mutually inconsistent, is included within the scope of the present disclosure.

What is claimed is:

1. A method comprising:
    accessing a trained machine learning model, wherein the machine learning model is trained using a corpus of labeled voice inputs, and wherein labels applied to the voice inputs include:
    a first label indicative of a user intent to convey a message to another user;
    a second label indicative of a user intent to engage in a human-to-computer dialog with an automated assistant; and
    a third label indicative of background conversation between multiple users;
    receiving, at a microphone of a first computing device of a plurality of computing devices, from a first user, voice input;
    analyzing the voice input, wherein the analyzing includes applying data indicative of an audio recording of the voice input as input across the trained machine learning model to generate output, wherein the output indicates that the first user intends to convey a message to a second user;
    determining, based on the analyzing, that the first user intends to convey the message to the second user;
    determining a location of the second user relative to the plurality of computing devices;
    selecting, from the plurality of computing devices, based on the location of the second user, a second computing device that is capable of providing audio or visual output that is perceptible to the second user; and
    causing the second computing device to exclusively provide audio or visual output that conveys the message to the second user.

2. The method of claim 1, wherein the selecting is performed in response to a determination, based on the location of the second user, that the second user is not within earshot of the first user.

3. The method of claim 1, wherein the location of the second user is determined based at least in part on one or more signals generated by a mobile computing device operated by the second user.

4. The method of claim 1, wherein the location of the second user is determined based at least in part on one or more signals generated by one or more of the plurality of computing devices other than the first computing device.

5. The method of claim 4, wherein the one or more signals include a signal indicative of the second user being detected by one or more of the plurality of computing devices other than the first computing device using passive infrared or ultrasound.

6. The method of claim 4, wherein the one or more signals include a signal indicative of the second user being detected by one or more of the plurality of computing devices other than the first computing device using a camera or a microphone.

7. The method of claim 1, wherein the analyzing includes determining that the voice input includes an explicit command to convey the message to the second user as an intercom message via one or more of the plurality of computing devices.

8. The method of claim 1, wherein the analyzing includes performing speech-to-text processing on the audio recording of the voice input to generate, as the data indicative of the audio recording, textual input, wherein the textual input is applied as input across the trained machine learning model.

9. The method of claim 1, further comprising:
    identifying a search query issued by the second user after the audio or visual output is provided by the second computing device;
    obtaining search results that are responsive to the search query, wherein the obtaining is based at least in part on the voice input from the first user; and
    causing one or more of the plurality of computing devices to provide output indicative of at least some of the search results.

10. A system comprising one or more processors and memory operably coupled with the one or more processors, wherein the memory stores instructions that, in response to execution of the instructions by one or more processors, cause the one or more processors to perform the following operations:
    receiving, at a microphone of a first computing device of a plurality of computing devices, from a first user, voice input;
    analyzing the voice input;

determining, based on the analyzing, that the first user intends to convey a message to a second user;

determining a location of the second user relative to the plurality of computing devices;

selecting, from the plurality of computing devices, based on the location of the second user, a second computing device that is capable of providing audio or visual output that is perceptible to the second user;

causing the second computing device to exclusively provide audio or visual output that conveys the message to the second user;

identifying a search query issued by the second user after the audio or visual output is provided by the second computing device;

disambiguating at least part of the search query issued by the second user based at least in part on the voice input from the first user;

obtaining search results that are responsive to the disambiguated search query; and causing one or more of the plurality of computing devices to provide output indicative of at least some of the search results.

11. The system of claim 10, wherein the selecting is performed in response to a determination, based on the location of the second user, that the second user is not within earshot of the first user.

12. The system of claim 10, wherein the location of the second user is determined based at least in part on one or more signals generated by a mobile computing device operated by the second user.

13. The system of claim 10, wherein the location of the second user is determined based at least in part on one or more signals generated by one or more of the plurality of computing devices other than the first computing device.

14. The system of claim 13, wherein the one or more signals include a signal indicative of the second user being detected by one or more of the plurality of computing devices other than the first computing device using passive infrared or ultrasound.

15. The system of claim 13, wherein the one or more signals include a signal indicative of the second user being detected by one or more of the plurality of computing devices other than the first computing device using a camera or a microphone.

16. At least one non-transitory computer-readable medium comprising instructions that, in response to execution of the instructions by one or more processors, cause the one or more processors to perform the following operations:

accessing a trained machine learning model, wherein the machine learning model is trained using a corpus of labeled voice inputs, and wherein labels applied to the voice inputs include:

a first label indicative of a user intent to convey a message to another user;

a second label indicative of a user intent to engage in a human-to-computer dialog with an automated assistant; and a third label indicative of background conversation between multiple users;

receiving, at a microphone of a first computing device of a plurality of computing devices, from a first user, voice input;

analyzing the voice input, wherein the analyzing includes applying data indicative of an audio recording of the voice input as input across the trained machine learning model to generate output, wherein the output indicates that the first user intends to convey a message to the second user;

determining, based on the analyzing, that the first user intends to convey the message to a second user;

determining a location of the second user relative to the plurality of computing devices;

selecting, from the plurality of computing devices, based on the location of the second user, a second computing device that is capable of providing audio or visual output that is perceptible to the second user; and causing the second computing device to exclusively provide audio or visual output that conveys the message to the second user.

17. The at least one non-transitory computer-readable medium of claim 16, wherein the selecting is performed in response to a determination, based on the location of the second user, that the second user is not within earshot of the first user.

18. The at least one non-transitory computer-readable medium of claim 16, wherein the location of the second user is determined based at least in part on one or more signals generated by a mobile computing device operated by the second user.

19. The at least one non-transitory computer-readable medium of claim 16, wherein the location of the second user is determined based at least in part on one or more signals generated by one or more of the plurality of computing devices other than the first computing device.

20. The at least one non-transitory computer-readable medium of claim 19, wherein the one or more signals include a signal indicative of the second user being detected by one or more of the plurality of computing devices other than the first computing device using passive infrared or ultrasound.

\* \* \* \* \*